United States Patent
Rahamim et al.

(10) Patent No.: US 9,621,483 B2
(45) Date of Patent: Apr. 11, 2017

(54) ETHERCAT PACKET FORWARDING WITH DISTRIBUTED CLOCKING

(75) Inventors: Hezi Rahamim, Ramat Gan (IL); Amir Yosha, Richon le Zion (IL)

(73) Assignee: NXP USA, INC., Austin, TX (US)

( * ) Notice: Subject to any disclaimer, the term of this patent is extended or adjusted under 35 U.S.C. 154(b) by 112 days.

(21) Appl. No.: 14/409,322

(22) PCT Filed: Jul. 2, 2012

(86) PCT No.: PCT/IB2012/053360
§ 371 (c)(1),
(2), (4) Date: Dec. 18, 2014

(87) PCT Pub. No.: WO2014/006446
PCT Pub. Date: Jan. 9, 2014

(65) Prior Publication Data
US 2015/0172220 A1 Jun. 18, 2015

(51) Int. Cl.
| | |
|---|---|
| *H04L 12/947* | (2013.01) |
| *H04L 12/437* | (2006.01) |
| *H04L 7/00* | (2006.01) |
| *H04L 12/42* | (2006.01) |
| *H04L 12/741* | (2013.01) |
| *H04L 12/931* | (2013.01) |

(52) U.S. Cl.
CPC ............ *H04L 49/25* (2013.01); *H04L 7/0008* (2013.01); *H04L 12/422* (2013.01); *H04L 12/437* (2013.01); *H04L 45/745* (2013.01); *H04L 49/351* (2013.01)

(58) Field of Classification Search
CPC ....... H04L 69/22; H04L 1/0083; H04L 47/10; H04L 47/13; H04L 41/0677; H04L 43/0852; H04L 43/50; H04L 12/437; H04L 12/422; H04L 12/42; H04L 45/745; H04L 49/351; H04L 49/25; H04L 7/0008
See application file for complete search history.

(56) References Cited

U.S. PATENT DOCUMENTS

| | | | |
|---|---|---|---|
| 2003/0117899 A1* | 6/2003 | Eidson | G04G 5/00 368/46 |
| 2006/0245454 A1 | 11/2006 | Balasubramanian et al. | |
| 2010/0088442 A1 | 4/2010 | Kuschke | |
| 2010/0168877 A1 | 7/2010 | Begey et al. | |
| 2010/0241773 A1 | 9/2010 | Rostan et al. | |

OTHER PUBLICATIONS

Jae Chol et al: "Dynamic Drift Compensation for the Distributed Clock in EtherCAT", In: Proceedings of the 2009 IEEE, International Conference on Robotics and Biomimetics, Dec. 19-23, 2009, pp. 1872-1876.
International Search Report and Written Opinion correlating to PCT/IB2012/053360 dated Dec. 26, 2012.

* cited by examiner

*Primary Examiner* — Kwang B Yao
*Assistant Examiner* — Ricardo Castaneyra (57) ABSTRACT

An EtherCAT packet forwarding system with distributed clocking is provided. The system comprises a master device and a plurality of slaves. The master comprises a processing port and a forward port for being respectively coupled to the at least two Ethernet ports of the master device in a redundant ring topology. The slaves comprise an internal clock indicating a current time, and a slave memory comprising a processing timestamp variable, a forwarding timestamp variable, a temporary timestamp variable and a copy-direct bit.

8 Claims, 5 Drawing Sheets

ETHERCAT PACKET FORWARDING WITH DISTRIBUTED CLOCKING

FIELD OF THE INVENTION

This invention relates to an EtherCAT packet forwarding system with distributed clocking, the system comprising a master device with at least two Ethernet ports and a plurality of slaves arranged in a redundant ring topology. The invention further relates to a method and a computer program product for employing distributed clocking in such a system.

BACKGROUND OF THE INVENTION

Ethernet for Control Automation Technology (EtherCAT) is an open high performance Ethernet-based fieldbus system. EtherCAT is used to apply Ethernet to automation applications which require short data update times (also called cycle times) with low communication jitter (for synchronization purposes) and low hardware costs. In normal Internet applications, data packets or frames are received and then interpreted and copied as process data at every node. With EtherCAT, the slave devices read the data addressed to them while the telegram passes through the device. Similarly, input data are inserted while the telegram passes through. The frames are only delayed by a fraction of a microsecond in each node, and many nodes can be addressed with just one frame.

For synchronization a distributed clock mechanism is applied. The typical process of establishing a distributed clock is initiated by the master sending a broadcast to all slaves to a certain address. Upon reception of this message, all slaves will measure the value of their internal clock twice, once when the message is received at its processing port and once when it returns at its forward port. The master can then read all measured values and calculate the delay for each slave. Total delays are calculated for each slave depending on their position in the slave topology and the correct parameter values needed for compensating for the delays are uploaded to the memories of the respective slaves. To keep the clocks synchronized after initialization, the master must regularly send out broadcast ARMW (Auto Increment Physical Read Multiple Write Telegram) packets to counter any effects of speed difference between the internal clocks of each slave. Each slave should adjust the speed of their internal clock or implement an internal correction mechanism whenever they have to adjust.

In EtherCAT systems, the slaves are often arranged in a redundant ring topology. The processing ports of the slaves are coupled to a first Ethernet port of the master, while a second Ethernet port of the master is coupled to the forward ports of the slaves. When, for whatever reason, a slave or a connection in the ring topology fails, all slaves at one side of the interruption are still coupled to the first Ethernet port while the other slaves can be addressed via the forward ports. However, when the ring topology is interrupted, the slaves that are connected via their forward ports are not able to support the distributed clocking mechanism without performing deep packet inspection on the passing EtherCAT data. This deep packet inspection requires both time and processing power. When not performing this deep packet inspection, proper synchronization is impeded which reduces the system reliability.

SUMMARY OF THE INVENTION

The present invention provides a system and a method as described in the accompanying claims. Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
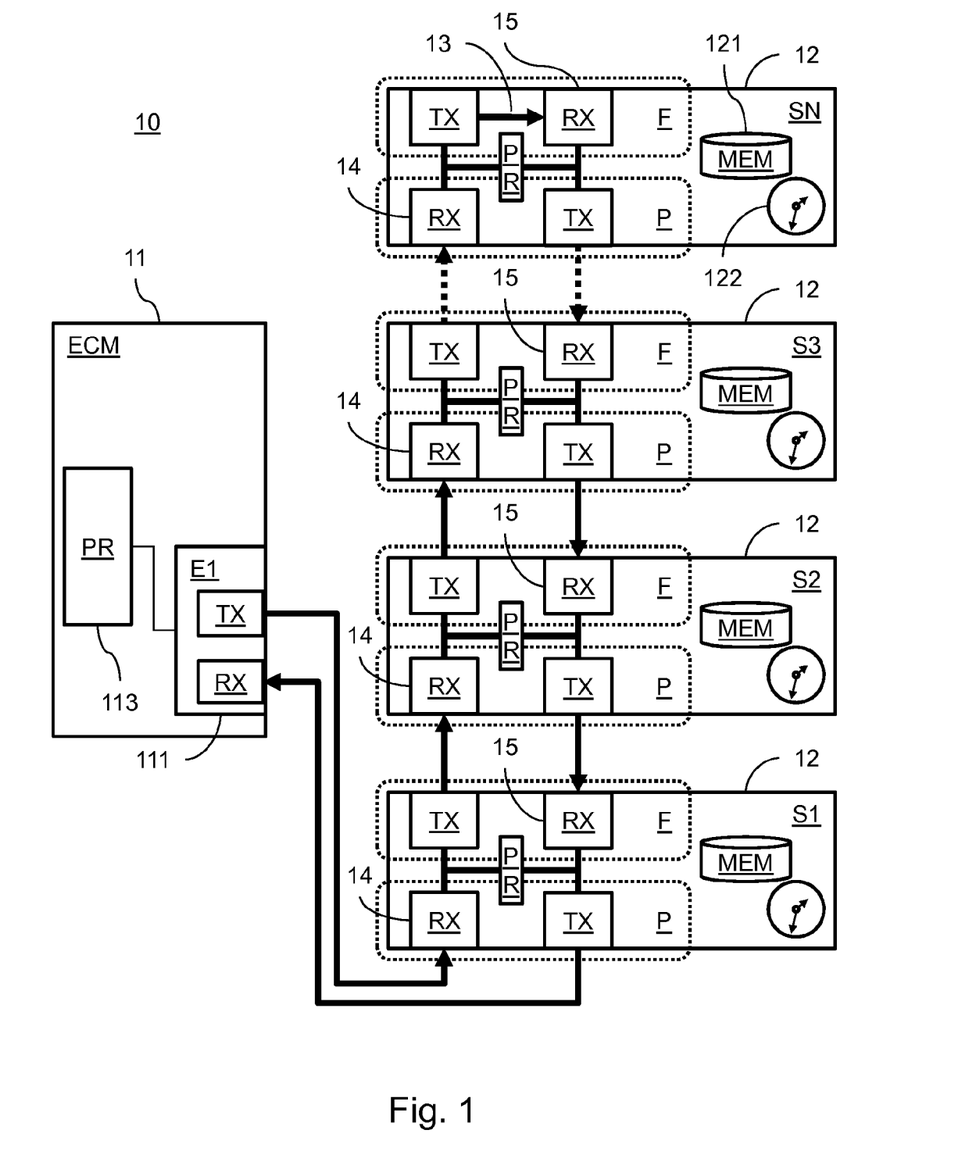
FIG. 1 schematically shows an EtherCAT network.

FIG. 1 schematically shows an EtherCAT network 10. The network 10 comprises an EtherCAT master (ECM) 11 and a number of EtherCAT slaves (S1, S2, S3, SN) 12 connected in series to the master 11.

Each slave 12 comprises two receiving ports (RX), i.e. a processing port (RX) 14 and a forward port (RX) 15, for receiving data from transmission ports (TX) of either EtherCAT slaves 12 or an EtherCAT master 11. Each slave 12 comprises two transmission ports, each one being coupled to a respective receiving port 14, 15. One transmission port is provided at the processing side (P) of the slave 12 and one on the forwarding side (F). The slaves 12 further comprise a memory 121 for temporarily or permanently storing data such as operational parameters. An internal clock 122 is provided for, e.g., timing operations to be performed by the processor or for providing a current time as input for certain processes.

The Ethernet port 111 of the master device 11 is coupled to a processor (PR) 113 which controls the overall operation of the EtherCAT network 10. The processor 113, e.g., prepares the data to be sent to the slaves 12 and processes the incoming data from the slaves 12.

At the processing side, the forwarding side or both, a processor (PR) of the slave 12 reads the data addressed to the respective slave 12 while the data passes through the device 12. Similarly, input data are inserted while the EtherCAT data passes through. The data frames are only delayed by a fraction of a microsecond in each slave 12, and many slaves 12 can be addressed with just one frame. At the processing side, the transmission port of the first slave (S1) 12 is coupled to the processing port 14 of the subsequent slave (S2) 12. At the last slave (SN) 12 on the processing side, the slave 12 does not 'feel' another slave at its forward port 15 and therefore perform a loopback 13 at its forwarding port 15. Via the forward ports 15 of the previous slaves (S3, S2, S1) and their corresponding transmission ports, the data returns to the Ethernet port of the master 11. When, e.g., slave S3 or the connection lines between slaves S2 and S3 are disconnected, the transmission port at the processing side of slave S2 is directly connected to the forward port 15 of S2 to create a new return path to the master 11.

Figure 2:
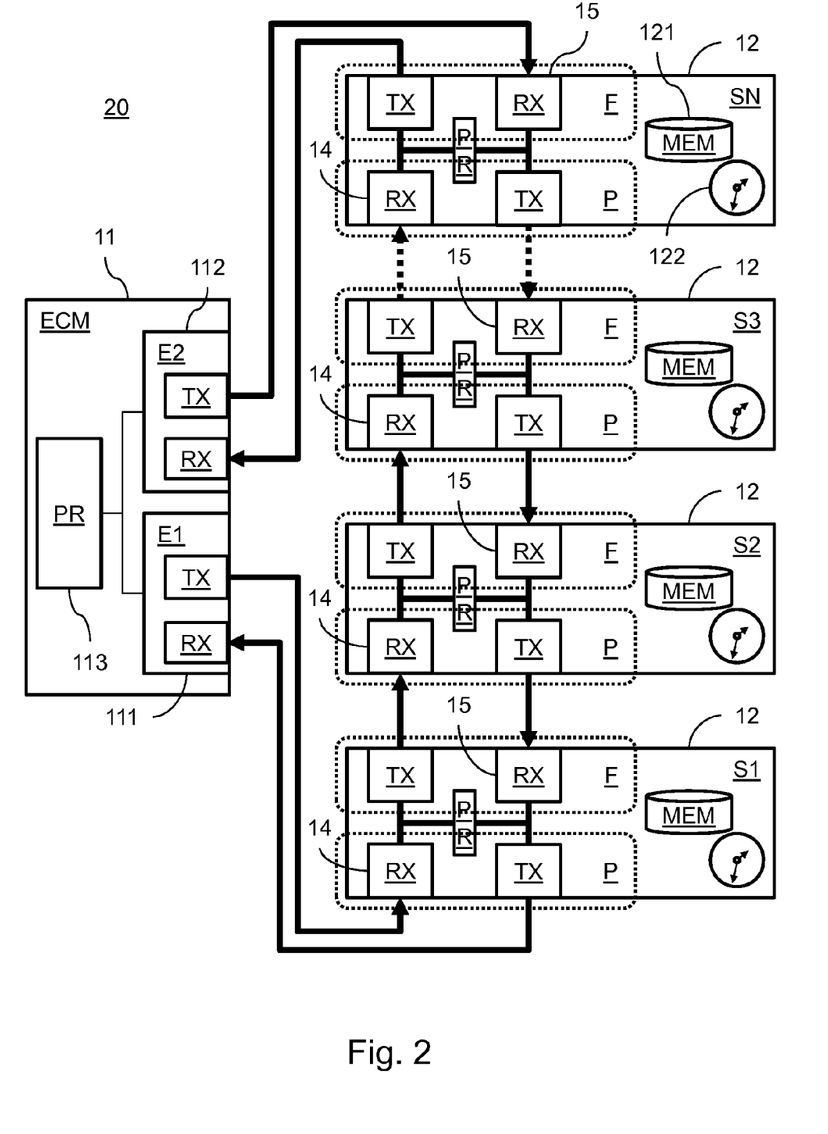
FIG. 2 schematically shows an EtherCAT network with a redundant ring topology.

FIG. 2 schematically shows an EtherCAT network 20 with a redundant ring topology. In addition to what was already explained above with reference to FIG. 1, the master device 11 in this network 20 comprises a second Ethernet port (E2) 112 which is also coupled to the master processor 113. The transmission port (TX) of the second Ethernet port 112 is connected to the forward port (RX) 15 of the last slave SN 12. When, for whatever reason, one of the other slaves (S1, S2, S3) 12 or a connection in the ring topology fails, all slaves 12 at one side of the interruption are still coupled to the first Ethernet port 111 while the other slaves 12 can be addressed via their forward ports 15.

According to the EtherCAT standard a circulating bit may be included in the EtherCAT frame datagram header, which means that the slave 12 receives it in the frame data. The circulating bit indicates whether the ring topology is intact or interrupted. An interruption of the ring topology may, e.g., occur when a cable breaks or a slave 12 is damaged. When a slave 12 in the network 20 detects that its processing port 14 is disconnected, it will set the circulating bit of all frames that he will receive from its forward port 15. When, e.g., slave S2 is removed, this will be detected by slave S3. Slave S3 will then provide a loopback in its processing port and will set the circulating bit for all data frames coming in at its forward port 15 to 1. As a result, the slaves that now are connected to the second Ethernet port 112 of the master only will notice that the circulation is interrupted when processing data arriving at the processing port 14.

Figure 3:
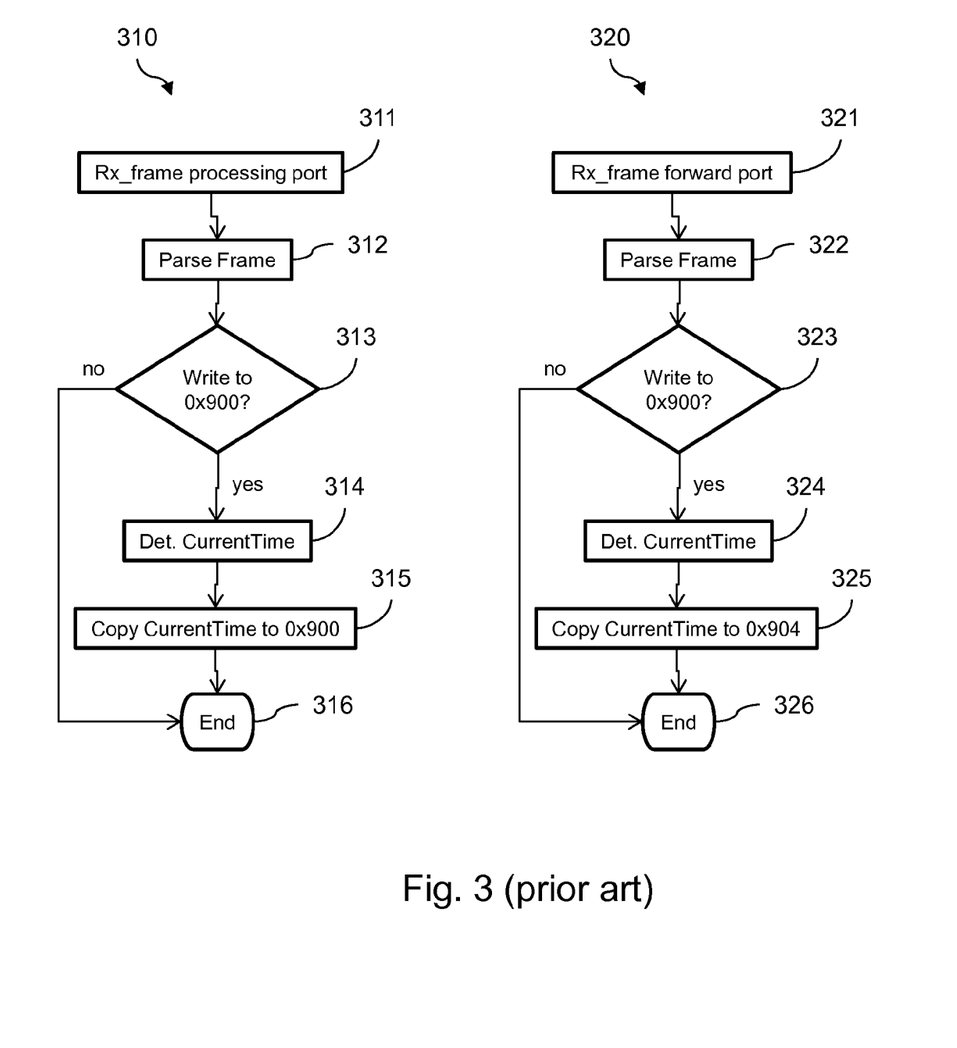
FIG. 3 shows two flow diagrams of common distributed clocking processes.

FIG. 3 shows two flow diagrams 310, 320 of common distributed clocking processes. The processes shown in FIG. 3 can be used in, e.g., the EtherCAT network 20 of FIG. 2. The EtherCAT system 20 uses the distributed clocking mechanism for synchronizing operations in the different slaves 12 of the EtherCAT network 10. The typical process of establishing a distributed clock is initiated by the master 11 sending a broadcast to all slaves 12 to a certain address. Upon reception of this message, the slaves 12 perform the processes shown in FIG. 3. When the message is received at the processing port 14 of the slave, the first process 310 is performed. When the message returns at its forward port 15, the second process 320 is performed. Because, in this case, both processes 310, 320 are very similar, the processes will further be elucidated with reference to the process 310 performed at the processing port 14. The process 320 to be performed at the forward port 15 will shortly be addressed afterwards.

In a frame receiving step 311, the slave 12 receives the Ethernet frame at its processing port 14. In parsing step 312, the incoming frame is parsed in order to determine whether it contains any data for the respective slave 12 to be processed. If during the next step 313, it is determined that the Ethernet data comprises a synchronization instruction, e.g. an instruction to write to register 0x900 in the slave memory 121, then the internal clock 122 of the slave 12 is used to determine the current time in time reading step 314. In time copying step 315, the measured time is then copied to a processing timestamp variable, e.g., in the register 0x900. After writing the current time in the register, no more steps are needed and the process at the processing side of the slave 12 ends 316. If the parsing 312 of the frame does not result in synchronization instructions, the steps of determining 314 and writing 315 the current time are skipped and the process is ended 316 directly.

When receiving 321 the Ethernet frame at the forward port 15 a similar process 320 is performed. This process 320 also includes a frame receiving step 321 and a parsing step 322. If a synchronization instruction is found in the next step 323, the current time is determined 324 and the current time is copied 325 to a different part of the slave memory 121, e.g. to register 0x904 and the process ends 326. Later on, the master 11 can then read all measured time values from the slave memory 121 and calculate the delay for each slave 12. Total delays are calculated for each slave 12 depending on their position in the slave topology and the correct parameter values needed for compensating for the delays are uploaded to the memories 121 of the respective slaves 12. To keep the clocks 122 synchronized after initialization, the master 11 or slave 12 must regularly send out the broadcast again to counter any effects of speed difference between the internal clocks 122 of each slave 12. Each slave 12 should adjust the speed of their internal clock 122 or implement an internal correction mechanism whenever they have to adjust.

Figure 4:
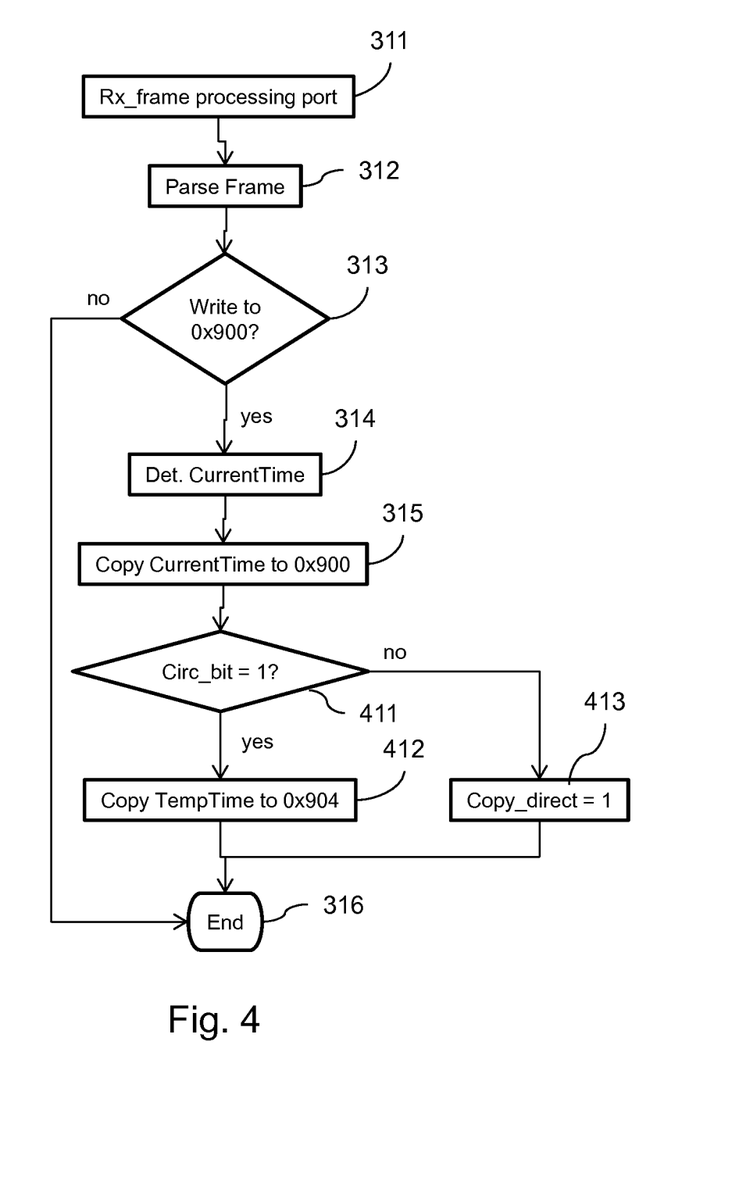
FIG. 4 shows a flow diagram of a distributed clocking process at the processing side of an EtherCAT slave.

FIG. 4 shows a flow diagram of a different distributed clocking process at the processing side of an EtherCAT slave 12. All steps 311, 312, 313, 314, 315, 316 that are the same as or similar to the steps already described above with reference to the process 310 in FIG. 3 have the same number as before. When synchronization instructions are found in the Ethernet data, the current time is copied to register 0x900 in the slave memory 121 in copying step 315. In addition to what was already described before, this process comprises three additional steps. After the copying step 315, it is verified whether the circulation of data through the redundant ring topology network 20 is still intact in a circulation verification step 411. Verifying the data circulation is, e.g., possible by reading a value of the circulating bit.

If the circulation verification step 411 indicates that circulation is not ok (e.g. circulating bit=1), then a temporary timestamp variable, stored in the slave memory 121 is copied 412 to a forwarding timestamp variable, e.g. in register 0x904 (at least in a different register than used for the processing timestamp variable in the earlier copying step 315). Below, with reference to FIG. 5, it will be explained how this temporary timestamp value is obtained.

If the circulation verification step 411 indicates that circulation is ok (e.g. circulating bit=0), then a copy direct bit, stored in the slave memory 121 is set 413 (e.g. copy direct bit=1). This copy direct bit setting step 413 influences the process that will now be discussed with reference to FIG. 5.

Figure 5:
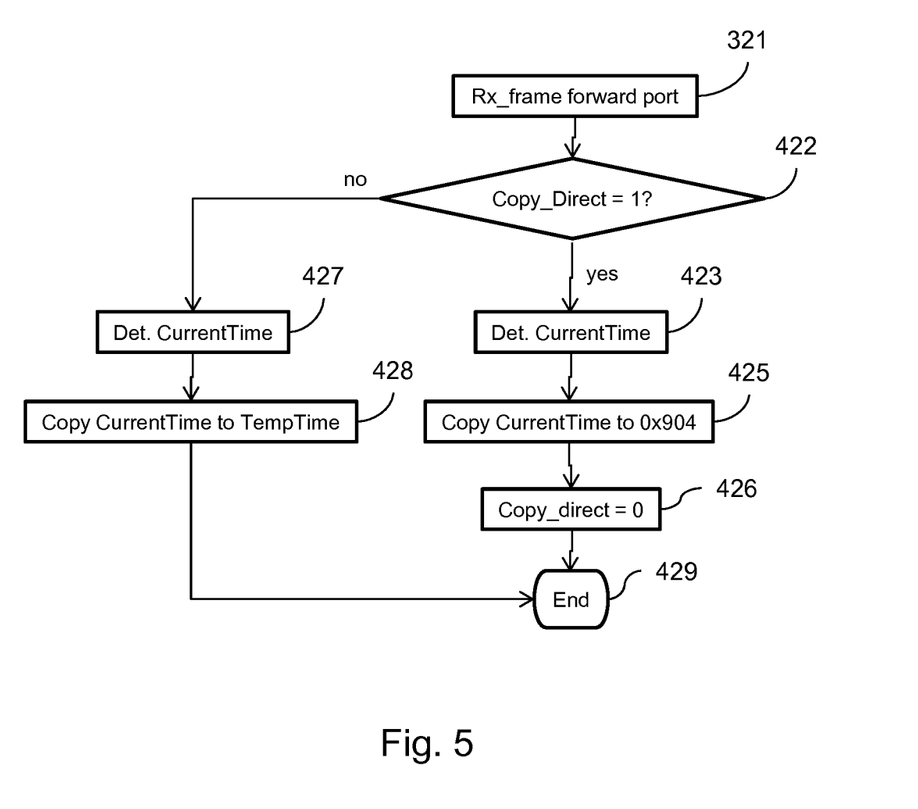
FIG. 5 shows a flow diagram of a distributed clocking process at the forwarding side of an EtherCAT slave.

FIG. 5 shows a flow diagram of a distributed clocking process at the forwarding side of an EtherCAT slave 12. When the Ethernet frame is received 321 at the forward port 14 of the slave 12, there is no need to parse the data and to analyze its content. Instead, the slave processor verifies 422 the copy direct bit. If the copy direct bit indicates is set (here to the value 1), then the current time is determined 423 using the internal clock 122 of the slave 12 and the current time is copied 425 to the forwarding timestamp variable, e.g. in register 0x904. After copying 425 the current time, the copy direct bit is reset (e.g. back to 0), before this process in the forwarding side of the slave 12 ends. If the verification 422 of the copy direct bit shows that no direct copying to the forwarding timestamp variable should be performed (copy direct bit=0), then the current time is determined 427 and stored 428 in the temporary timestamp variable in the slave memory 121. Later on, when the Ethernet data frame is received at the processing port 14 and if the circulating bit indicates uninterrupted communication, this temporary timestamp variable is copied to the forwarding timestamp variable in copying step 412 (see FIG. 4).

By employing the circulating bit, the copy direct bit and the temporary timestamp variable in the way described above with reference to FIGS. 4 and 5, the synchronization process leads to the same result when the ring topology is interrupted as when the data circulation runs as planned.

This result is obtained without requiring parsing of the Ethernet data frame at the forwarding side of the slave 12. For this synchronization results, it does not matter whether the slave is connected to the master 11 via its processing port 14 or its forward port 15.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 20 are circuitry located on a single integrated circuit or within a same device. Alternatively, system 20 may include any number of separate integrated circuits or separate devices interconnected with each other. For example, memory may be located on a same integrated circuit as master 11 or on a separate integrated circuit or located within another peripheral or slave discretely separate from other elements of system 20. Peripheral and I/O circuitry may also be located on separate integrated circuits or devices. Also for example, system 20 or portions thereof may be soft or code representations of physical circuitry or of logical representations convertible into physical circuitry. As such, system 20 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 20, for example, from computer readable media such as memory or other media on other computer systems. Such computer readable media may be permanently, removably or remotely coupled to an information processing system such as system 20. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, the system is realized in a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device. For example, However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A packet forwarding system, the system comprising:
    a plurality of slave devices, each slave device comprising
        a processing port and a forward port coupled to ports of a master device in a redundant ring topology,
        an internal clock configured to provide a current time, and
        a slave memory storing a processing timestamp variable, a forwarding timestamp variable, a temporary timestamp variable and a copy-direct bit, wherein the system is configured to
        generate a header of a frame datagram for each slave that comprises a circulating bit indicating whether the redundant ring topology is interrupted,
        when the frame datagram is received at the forward port of a slave device and the copy-direct bit is set, the current time is copied to the forwarding time stamp variable and the copy-direct bit is reset,
        when the frame datagram is received at the forward port of the slave device and the copy-direct bit is not set, the current time is copied to the temporary time stamp variable,
        when the frame datagram is received at the processing port of the slave device, the current time is copied to the processing time stamp variable and if the circulating bit indicates that the redundant ring topology is not interrupted, the copy-direct bit is set, and if the circulating bit indicates that the redundant ring topology is net interrupted, the temporary timestamp variable is copied to the forwarding timestamp variable.

2. The system of claim 1 further comprising the master device, wherein the master device comprises at least two ports.

3. The system of claim 2 wherein the at least two ports of the master device are Ethernet ports.

4. The system of claim 1 wherein the frame datagram is an Ethernet for Control Automation Technology (EtherCAT) frame diagram.

5. A method for synchronizing an packet forwarding system with distributed clocking, the method comprising:
    receiving a frame datagram at one of a forward port or a processing port of a slave device of a plurality of slave devices;
    when the frame datagram is received at the forward port and a copy-direct bit in a slave memory of the slave is set:
        determining a current time using an internal clock of the slave device,
        copying the current time to a forwarding time stamp variable in a memory of the slave device, and
        resetting the copy-direct bit;
    when the frame datagram is received at the forward port and the copy-direct bit is not set:
        determining the current time using the internal clock of the slave,
        copying the current time to a temporary time stamp variable in the slave memory; and
    when the frame datagram is received at the processing port, copying the current time to a processing time stamp variable in the slave memory, and if the circulating bit indicates that the redundant ring topology is not interrupted, setting the copy-direct bit, and if the circulating bit indicates that the redundant ring topology is interrupted, copying the temporary timestamp variable to the forwarding timestamp variable.

6. The method of claim 5 further comprising:
    coupling the plurality of slave devices to a master device in a redundant ring topology.

7. The method of claim 6 wherein said coupling is performed to two Ethernet ports of the master device.

8. The method of claim 5 wherein the frame datagram is an Ethernet for Control Automation Technology (EtherCAT) frame datagram.

* * * * *